United States Patent
Baldwin et al.

(10) Patent No.: US 10,678,781 B2
(45) Date of Patent: *Jun. 9, 2020

(54) REPAIRING A LINK BASED ON AN ISSUE

(71) Applicant: International Business Machines Corporation, Armonk, NY (US)

(72) Inventors: Nicholas A. Baldwin, Pyrmont (AU); Mark C. Hampton, Carlton (AU); Stefan Hepper, San Jose, CA (US); Eric Martinez de Morentin, Pyrmont (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 142 days.

This patent is subject to a terminal disclaimer.

(21) Appl. No.: 14/290,498

(22) Filed: May 29, 2014

(65) Prior Publication Data

US 2015/0142754 A1    May 21, 2015

Related U.S. Application Data

(63) Continuation of application No. 14/085,052, filed on Nov. 20, 2013.

(51) Int. Cl.
*G06F 7/00* (2006.01)
*G06F 17/30* (2006.01)
(Continued)

(52) U.S. Cl.
CPC .......... *G06F 16/24* (2019.01); *G06F 11/0709* (2013.01); *G06F 11/0793* (2013.01); *G06F 16/9558* (2019.01); *G06F 16/9566* (2019.01)

(58) Field of Classification Search
CPC ........ G06F 17/30386; G06F 17/30882; G06F 17/30887; G06F 16/9566; G06F 16/9558; G06F 16/24

See application file for complete search history.

(56) References Cited

U.S. PATENT DOCUMENTS

| 5,935,210 A * | 8/1999 | Stark ................ G06F 17/3089 |
| | | 707/E17.116 |
| 6,044,378 A | 3/2000 | Gladney |
| (Continued) | | |

FOREIGN PATENT DOCUMENTS

| CN | 101359335 B | 2/2009 |
| CN | 102880522 B | 3/2013 |

OTHER PUBLICATIONS

D'Inverno et al, Soft-Link Hypertext for Information Retrieval, Information and Software Technology 44 (2001); pp. 101-112; www.elsevier.com.

(Continued)

*Primary Examiner* — Hasanul Mobin
(74) *Attorney, Agent, or Firm* — Steven L. Nichols; Fabian VanCott

(57) ABSTRACT

Repairing a link based on an issue includes associating at least one metadata segment with a link, identifying, in a resource repository, at least one resource that matches the at least one metadata segment, determining if there is an issue between the link and the at least one resource, and repairing the link based on the issue between the link and at least one resource.

18 Claims, 7 Drawing Sheets

(51) Int. Cl.
*G06F 16/24* (2019.01)
*G06F 16/955* (2019.01)
*G06F 11/07* (2006.01)

(56) References Cited

U.S. PATENT DOCUMENTS

| | | |
|---|---|---|
| 7,111,232 B1 | 9/2006 | Bascom |
| 7,333,966 B2 * | 2/2008 | Dozier ................ G06F 16/9558 706/21 |
| 7,386,614 B2 * | 6/2008 | Barritz .............. H04L 29/12132 709/226 |
| 7,606,810 B1 * | 10/2009 | Jeavons ................ G06Q 30/02 |
| 7,668,929 B1 | 2/2010 | Ruhlen |
| 7,720,823 B1 * | 5/2010 | Rehfeld .............. G06F 16/9558 707/691 |
| 8,326,941 B2 * | 12/2012 | Aviles Sanchez .. G06F 16/9566 709/217 |
| 8,356,053 B2 | 1/2013 | Murthy et al. |
| 8,544,039 B2 * | 9/2013 | Chang ................... G06Q 30/02 703/23 |
| 8,694,531 B1 * | 4/2014 | Stearns ............. G06F 17/30761 707/732 |
| 8,898,297 B1 * | 11/2014 | Taylor ................ G06F 16/9535 709/224 |
| 2002/0103936 A1 * | 8/2002 | Jano ........................ H04L 29/06 709/246 |
| 2002/0165955 A1 * | 11/2002 | Johnson .............. G06F 17/3089 709/224 |
| 2003/0061490 A1 * | 3/2003 | Abajian .................. G06F 16/48 713/176 |
| 2004/0068527 A1 * | 4/2004 | Smith, III ............. G06F 16/951 |
| 2005/0089017 A1 * | 4/2005 | Fukada ............. G06F 17/30884 370/351 |
| 2006/0230050 A1 * | 10/2006 | Rehfeld ............ G06F 17/30887 |
| 2008/0263193 A1 | 10/2008 | Chalemin et al. |
| 2012/0011167 A1 * | 1/2012 | Schmidt ................ H04W 4/185 707/802 |
| 2012/0124029 A1 * | 5/2012 | Kant .................... G06F 17/3002 707/715 |
| 2013/0173606 A1 * | 7/2013 | Pasumarthi ....... G06F 17/30336 707/723 |
| 2014/0088952 A1 * | 3/2014 | Fife ........................ G06F 17/27 704/9 |
| 2014/0280566 A1 * | 9/2014 | Chen ..................... H04L 67/306 709/204 |

OTHER PUBLICATIONS

Perugini, Saverio: Symbolic links in the Open Directory Project, www.elsevier.com; Jun. 29, 2007; pp. 1-21.
Shields, Ian, Learn Linux, 101: Create and change hard and symbolic links; Use multiple names for the same file; IBM Corporation Jun. 1, 2010; pp. 1-12.

* cited by examiner

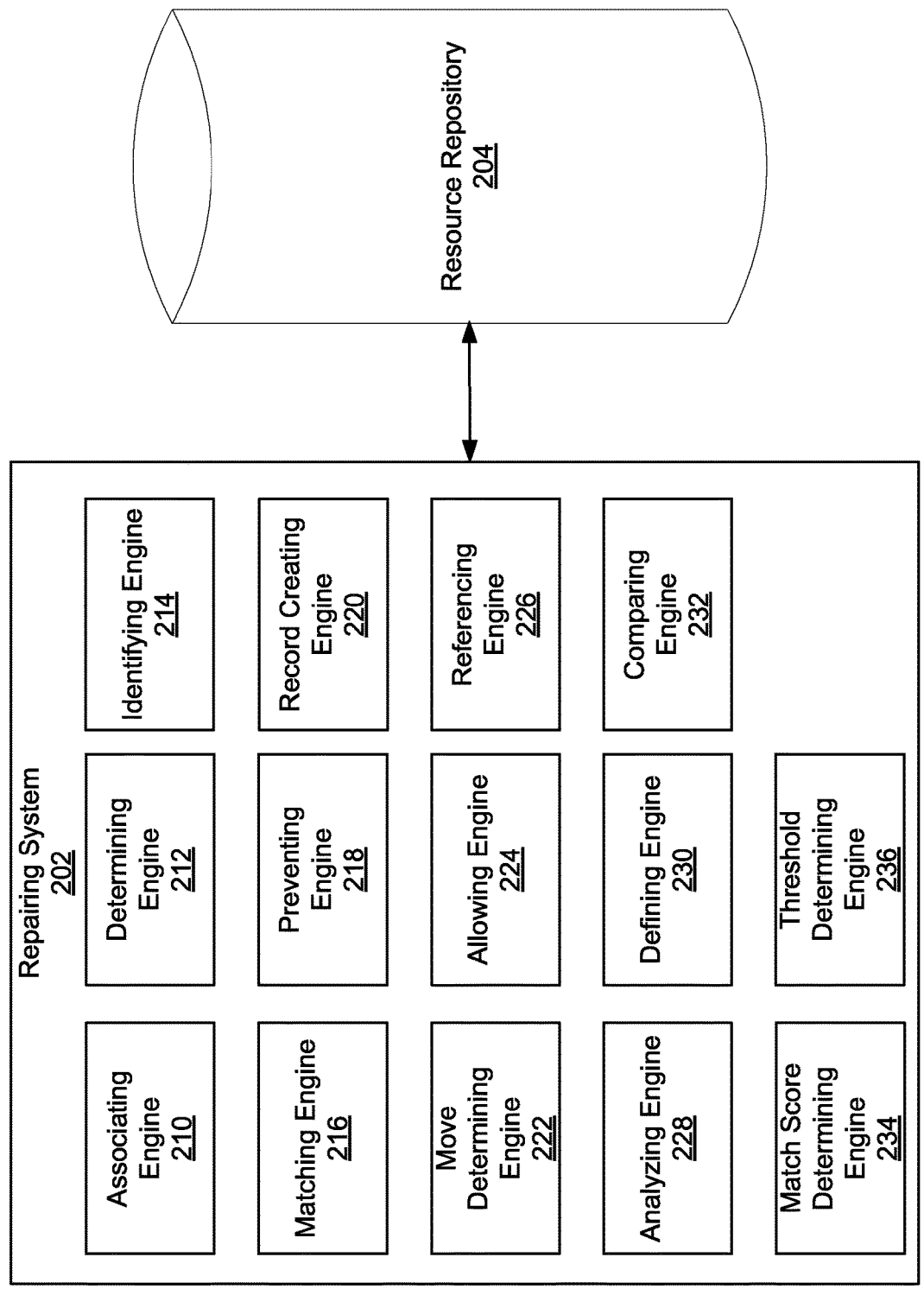

US 10,678,781 B2

REPAIRING A LINK BASED ON AN ISSUE

RELATED APPLICATION

The present application is a continuation of the previous U.S. patent application Ser. No. 14/085,052, filed Nov. 20, 2013 and entitled: "REPAIRING A LINK BASED ON AN ISSUE," and claims priority to that application under 35 U.S.C. § 120.

BACKGROUND

The present invention relates to repairing a link, and more specifically to repairing a link based on an issue.

Links allow a user to navigate through a digital document such as a website. The links allow a user, using a user device, to navigate between several sections of a webpage on a website. Further, the links allow the user to navigate between several webpages on the website. Still further, links allow the user to navigate from one website to another website.

BRIEF SUMMARY

A method for repairing a link based on an issue includes associating at least one metadata segment with a link, identifying, in a resource repository, at least one resource that matches the at least one metadata segment, determining if there is an issue between the link and the at least one resource, and repairing the link based on the issue between the link and at least one resource.

A system for repairing a link based on an issue includes an associating engine to associate at least one metadata segment with a link, an identifying engine to identify, in a resource repository, at least one resource that matches the at least one metadata segment, a matching engine to match the at least one resource to the at least one metadata segment, a determining engine to determine if there is an issue between the link and the at least one resource, and a repairing engine to repair the link based on the issue between the link and at least one resource.

A computer program product includes a computer readable storage medium, the computer readable storage medium having computer readable program code embodied therewith. The computer readable program code having computer readable program code to associate at least one metadata segment with a link, identify, in a resource repository, at least one resource that matches the at least one metadata segment, and repair the link based on an issue between the link and at least one resource.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 2 is a diagram of an example of a web content management system, according to one example of the principles described herein.

Throughout the drawings, identical reference numbers designate similar, but not necessarily identical, elements.

DETAILED DESCRIPTION

Figure 1:
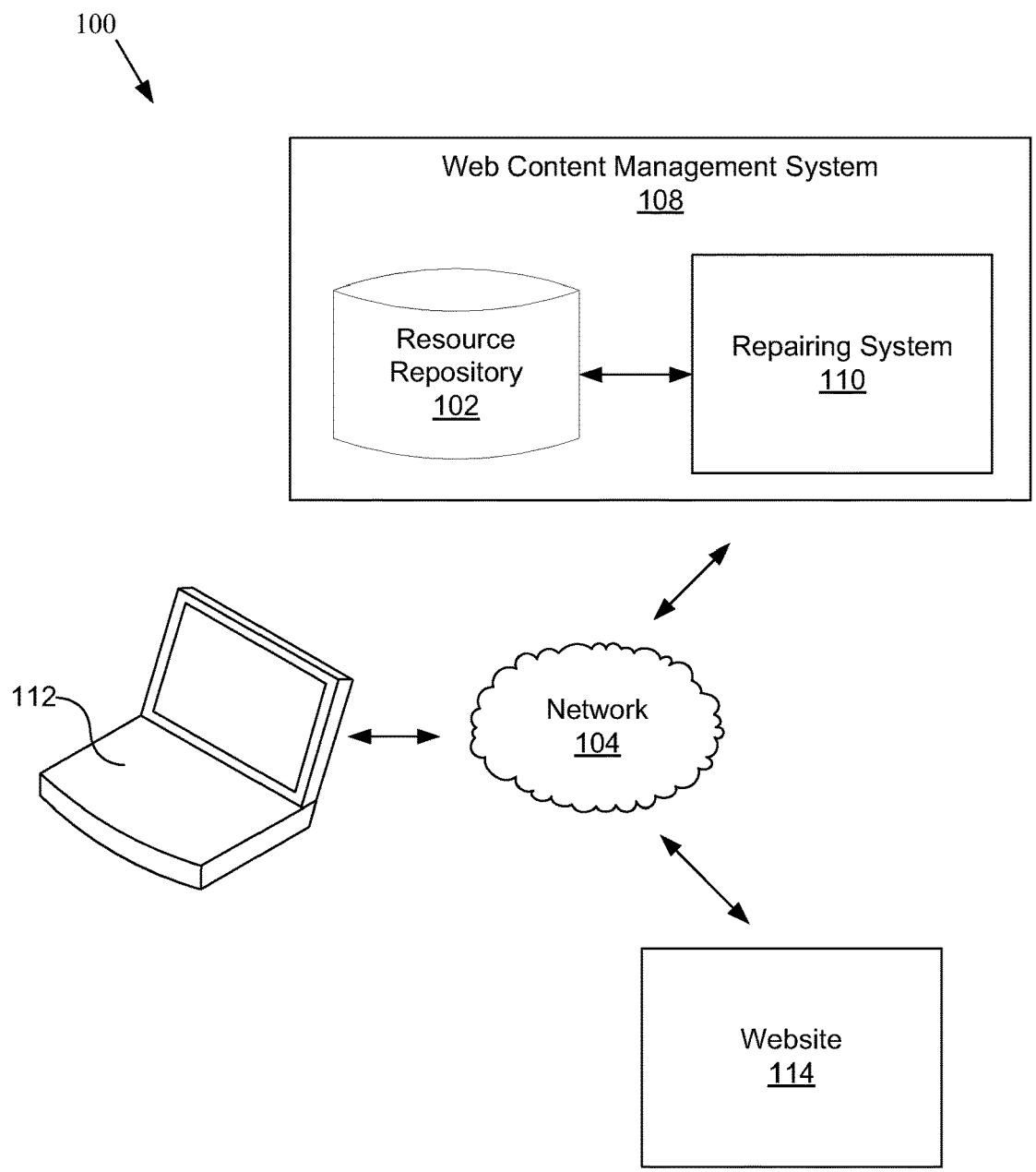
FIG. 1 is a diagram of a system for repairing a link based on an issue, according to one example of the principles described herein.

The present specification describes a method and system for repairing a link based on an issue such that the issue between the link and a resource is repaired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Further, as used in the present specification and in the appended claims, the term "a number of" or similar language is meant to be understood broadly as any positive number comprising 1 to infinity; zero not being a number, but the absence of a number.

As mentioned above, a link may serve as a mechanism for navigation in a website or other digital documents. In one example, a link can experience issues and become a broken link. For example, a link that is associated to a resource that is internal to a website or digital document may become a broken link when a file name of the resource is renamed, moved, or a license for the resource expires. As a result, if a link becomes a broken link, the link may no longer allow a user to navigate a website or a digital document as intended.

In another example, a link may become a broken link when a website is moved from a test platform to a deployment platform. For example, a repository that includes resources for the link for the deployment platform may not contain the same resources as a repository for the test platform. As a result, when the website is published on the deployment platform, the website may contain links that are associated to resources that do not exist in the repository for the deployment platform. Further, a link may become a broken link in the process of rebranding, repurposing, or creating a new version of a website.

Additionally, a link that is associated to resources that are external to a website or digital document may become a broken link. For example, a link in a first website may be associated to a uniform resource locator (URL) of an article contained in a second website. In keeping with the given example, if the URL of the article is modified, the link in the first website may become a broken link because the link no longer is associated to the URL of the article. As a result, if a link becomes a broken link, the link may no longer allow a user to navigate to the URL as intended.

Further, a link that becomes a broken link may lead to a lower search engine ranking when a user is searching for a type of website. A lower search engine rating may make it more difficult for a user visiting the website for the first time to discover the website.

Still further, if a link for formatting elements of a webpage becomes a broken link, then the webpage may not be displayed correctly. In one example, if a link for formatting elements of a webpage becomes a broken link, then the webpage may become entirely unusable.

As mentioned above, a link that becomes a broken link may be undesirable for several reasons. In another example, a user visiting a company's website expects the links in the website to function as intended. If a link on the website becomes a broken link, the user's confidence in a company's website may become diminished when the user encounters a broken link on the company's website. Further, the users may become frustrated and visit the company's website less frequently. As a result, the website for the company may experience a loss in revenue if users do not buy their goods and services through the company's website.

A link that has become a broken link has been proven to be a difficult task for a website author to manually repair. To manually repair a link that has become a broken link, the website author identifies the link that has become a broken link. In one example, a website may contain thousands of links and hundreds of broken links. As a result, the website author manually identifies if a link has become a broken link. If the link has become a broken link, the website author manually formats the link and manually repairs the broken link by associating the broken link to an original resource or a new resource. As a result, manually repairing broken links for a website containing hundreds of broken links is a time consuming task for the website author.

The principles herein describe a system and a method for repairing a link based on an issue, the method includes associating at least one metadata segment with a link, identifying, in a content repository, at least one resource that matches the at least one metadata segment, determining if there is an issue between the link and the at least one resource, and repairing the link based on the issue between the link and at least one resource. Such a method prevents a link from becoming a broken link by repairing the issue between the link and at least one resource without manual intervention from a user.

The method further includes matching the at least one resource to the at least one metadata segment. More about matching the at least one resource to the at least one metadata segment will be described in detail later on in this specification.

In the present specification and in the appended claims, the term "link" is meant to be understood broadly as mechanism for navigation in a webpage or a digital document. In one example, a link allows a user to navigate between a number of webpages in a website or pages in a digital document. In another example, a link allows a user to navigate from one website to another website or one digital document to another digital document. Further, a link may be a hard link, a soft link, or an enforced hard link. In one example, a hard link is associated directly to a resource. Further, a soft link is associated to a memory address and the memory address is associated to a resource. Further, an enforced hard link is a link with protections placed on the link so that a resource that it is associated with the link is prevented from being removed.

In the present specification and in the appended claims, the term "resource" is meant to be understood broadly as data that is associated to a link. In one example, a resource may include data such as images, videos, audio, texts, webpages, URLs, composite resource created by a web content management system, other resources, or combinations thereof.

In the present specification and in the appended claims, the term "resource repository" is meant to be understood broadly as a storage device such as datacenter for storing resources. In one example, the resources be stored, retrieved, searched for, and modified in the resource repository.

In the present specification and in the appended claims, the term "resource type" is meant to be understood broadly as a category of resources having common attributes. In one example, a resource type may include images such as photographs, clip art, user interface elements, backgrounds, logos, or images or combinations thereof. In another example, a resource type may include videos such as promotional videos, instructional videos, other videos or combinations thereof. In yet another example, a resource type may include audio such as user interface audio, podcasts, music, other audio, or combinations thereof. In yet another example, a resource type may include HyperText Markup Language (HTML), cascading style sheets (CSS), templates, page themes, scripts, text, rich text, user interface text, titles, labels, or combinations thereof.

In the present specification and in the appended claims, the term "metadata segment" is meant to be understood broadly as data that describes a link or a resource. In one example, metadata segments may include content type, size, format, theme, keywords, tags, color, or language. Further, when a resource is an image, metadata segments may include size, dimensions, encoding, semantic content, tone, predominant color, topic, category, about the image. When the resource is a video, metadata segments may include size, dimensions, encoding, quality, language, key words, semantic meaning, tone, topic, category, about the video. When the resource is a link to an internal or external webpage, metadata segments may contain information relating to the topic, specific words, ranking, or combinations thereof of the webpage to be linked to.

In the present specification and in the appended claims, the term "match score" is meant to be understood broadly as a comparison between a metadata segment and a resource. In one example, a match score may be a numerical range. For example, 0 to 10, where 0 indicates the comparison between a metadata segment and a resource is not comparable and 10 indicates the comparison between a metadata segment and a resource is very comparable. In another example, a weight may be symbolic. For example, not comparable to very comparable.

FIG. 1 is a diagram of a system for repairing a link based on an issue, according to one example of the principles described herein. As mentioned above, a link may serve as a mechanism for navigation in a website or digital document. If a link experiences an issue, the link may become a broken link. As a result, a user may not navigate a webpage or digital document. As will be described below, a repairing system on web content management system access a resource repository to repair link based on an issue between the link and at least one resource in the resource repository. Such a method prevents a link from becoming a broken link by repairing the issue between the link and at least one resource without manual intervention from a user.

In one example, the system (100) includes a user device (112). In this example, the user device (112) is in communication with a web content management system (108). In one example, the web content management system (108) aides website designers, administrators, and developers to create links for a website (114) using a user device (112). Further, the web content management system (102) includes a resource repository (102). In this example, the resource repository (102) includes databases, file structures, other data structures, or combinations thereof. Further, the content repository (102) may include resources such as images, videos, audio, text, website page, URL, composite resource created by a web content management system, other resources, or combinations thereof.

As mentioned above, the system (100) includes a repairing system (110). In one example, the repairing system (110) associates at least one metadata segment with a link. In one example, a link is associated with general metadata segments which indicate what types of resources the link should be associated to for the website (114). Further, the repairing system (110) identifies, in the content repository (102), at least one resource that matches the at least one metadata segment.

The repairing system (110) determines if there is an issue between the link and the at least one resource. In one example, a link for the website (114) is initially associated to a resource. In this example, the resource is modified and becomes unavailable for the link. As a result, the link becomes a broken link.

The repairing system (110) repairs the link based on the issue between the link and at least one resource. In keeping with the given example, the link is repaired by identifying, in the content repository (102), a second resource that is similar to the initial resource mentioned above.

In yet another example, a link for the website (114) is associated with a resource and the link is prevented from being associated to any other resource. In this example, the resource may be prevented from being removed. Upon being moved to a new platform, the link may be allowed to be associated with other resources. As a result, the link may be repaired.

As a result, the repairing system (110) prevents a link on a website (114) from becoming a broken link by repairing the issue between the link and at least one resource without manual intervention from a user.

While this example has been described in reference to the resource repository being located in a web content management system, the resource repository may be located in any appropriate location. For example, the content repository may be located in a user device, the repairing system, on a server, other locations, or combinations thereof.

Further, while this example has been described in reference to the repairing system being located in a web content management system, the repairing system may be located in any appropriate location. For example, the repairing system may be located in a user device, the repairing system, on a server, other locations, or combinations thereof.

FIG. 2 is a diagram of an example of a web content management system, according to one example of the principles described herein. As mentioned above a web content management system (200) includes a repairing system (202). In one example, the repairing system (202) includes a number of engines (210 to 236) to repair a link based on an issue. The engines (210 to 236) refer to a combination of hardware and program instructions to perform a designated function. Each of the engines (210 to 236) may include a processor and memory. The program instructions are stored in the memory and cause the processor to execute the designated function of the engine. As will be described below, the repairing system (202) prevents a link from becoming a broken link by repairing the issue between the link and at least one resource without manual intervention from a user.

In one example, the repairing system (202) includes an associating engine (210) to associate at least one metadata segment with a link. In some examples, metadata segments are assigned a weight. In one example, a weight may be a numerical range. For example, 0 to 10, where 0 indicates no weight is to be assigned to the metadata segments and 10 indicates the greatest weight is to be assigned to the metadata segments. In another example, a weight may be symbolic. For example, not relevant to very relevant. More information about associating at least one metadata segment with a link will be described in detail later on in this specification.

Further, in one example, a metadata segment describes attributes of the resource that a link may be associated to. In this example, metadata segments may include, content type, size, format, theme, tags, color, language, or combinations thereof.

In one example, when a resource is an image, the metadata segments may include a size, dimensions, encoding, semantic content, tone, predominant color, topic, category, or combinations thereof of the image. In another example, when the resource is a video, the metadata segments may include size, dimensions, encoding, quality, language, semantic meaning, tone, topic, category, or combinations thereof for the video. In yet another example, when the resource is a link to an internal or external webpage, metadata segments may contain information relating to a topic, specific words, a ranking, or combinations thereof of for the webpage.

In keeping with the given example, the repairing system (202) includes a determining engine (212) to determine if there is an issue between the link and the at least one resource. In one example, the determining engine (212) determines if the issue between the link and the at least one resource is a result of the link becoming a broken link. In another example, the determining engine (212) determines if the issue between the link and the at least one resource is a result of the link being moved to a new platform such as a new resource repository, computing system, or combinations thereof.

Further, the repairing system (202) may include an identifying engine (214). In one example, the identifying engine (214) identifies, in a resource repository (204), at least one resource that matches the at least one metadata segment. In this example, the at least one metadata segment is associated with the link. As mentioned above, the resource repository (204) includes a number of resources. Further, the resource repository (204) may include resources such as documents, images, video, user interface elements, HTML, CSS, page themes, composite content, internal pages, external pages, related pages, other resources, or combinations thereof.

In keeping with the given example, the repairing system (202) includes a matching engine (216). In this example, the matching engine (216) matches the at least one resource to the at least one metadata segment. As will be describe in other parts of this specification, the matching engine (216) matches the at least one resource to the at least one metadata segment by associating the link to the memory location of the at least one resource.

In one example, a link may be assigned a number of attributes. By assigning a link a number of attributes, the link may become a broken link if the link is assigned to other resources in the resource repository (204). As a result, the repairing system (202) includes a preventing engine (218). In one example, the preventing engine (218) prevents the link from being associated with another resource in the resource repository (204). For example, the preventing engine (218) prevents the resource associated to the link from being moved or deleted. As a result, the preventing engine (218) prevents the link from becoming a broken link.

As mentioned above, a link may be moved to a new platform. In one example, if a link is moved to a new platform, the link may become a broken link. As a result, the repairing system includes a move determining engine (222). In this example, the moving determining engine (22) determines if a link has been moved to a new platform. As will be describe below, if the link has been moved to a new platform, the repairing system (202) may repair the link accordingly.

Further, the repairing system (202) includes a record creating engine (220). In one example, the record creating engine (220) creates a record of the link associated with the at least one resource. In another example, the record creating engine (220) creates a record indicating the at least one metadata segment is associated with the link. As a result, if the link is moved to a new platform, the record creating engine (220) allows the repairing system (202) to keep track of the link being moved to the new platform by creating the record.

In one example, a link that is prevented from being associated to another resource may be reverted to being allowed to be associated with another resource via an allowing engine (224). In keeping with the given example, the repairing system (202) includes a referencing engine (226). In one example, the referencing engine (226) references the record created by the record creating engine (220). As a result, the referencing engine (202) may aid the repairing system (202) in identifying the at least one resource that matches the at least one metadata segment, if the link is moved to a new platform.

The repairing system (202) includes an analyzing engine (228). In one example, the analyzing engine (228) analyzes the at least one resource. By analyzing the at least one resource, the analyzing engine generates at least one metadata segment about the at least one resource.

In one example, the analyzing engine (228) may analyze files. In this example, the analyzing engine (228) analyzes a file's attributes such as file size, topic, or theme. In another example, the analyzing engine (228) may analyze images. In this example, the analyzing engine (228) analyzes an image for content, resolution, encoding, quality, tone, context, people, or combinations thereof. In yet another example, the analyzing engine (228) may analyze videos. In this example, the analyzing engine (228) analyzes a video for similar attribute as images and, in addition, the audio for the video may be analyzed by the analyzing engine (228) for specific words, specific phrases, or combinations thereof. In another example, the analyzing engine (228) may analyze a CSS. In one example, the CCS may be analyzed for theme compatibility, colors, styles, version, or combinations thereof. In yet another example, the analyzing engine (228) may analyze links to other websites. In this example, the links to other websites may be analyzed for topic, content, popularity, profitability, being up-to-date, or combinations thereof. Further, metadata segments generated from the by the analysis engine (228) may then be associated with the link. In yet another example, the link may then be associated to the at least one resource.

The repairing system (202) may further include a defining engine (230). In one example, the defining engine (230) defines the at least one resource with a resource type. Further, the defining engine (230) may in turn generate a list of metadata segments that may be associated with the link. For example, defining a resource, such as an image, allows the link to be associated with metadata segments pertaining to images.

In keeping with the given example, the repairing system (202) may match the at least one resource to the at least one metadata segment to repair the link. In one example, to match the at least one resource to the at least one metadata segment to repair the link, the repairing system (202) may include a comparing engine (232). In this example, the comparing engine (232) compares the metadata segments associated with the link to at least one resource. Further, the comparing engine (232) compares the link's metadata segments with the resource's metadata segments. In some examples, metadata segments are given a weight for comparing. For example, an image may include an image size, a color, and a subject. In one example, the image size may be very significant. As a result, the image is assigned a weight of 8. In keeping with the given example, a color in the image is less significant. As a result, the color in the image is assigned a weight of 6. Further, the subject of the image may be a woman. In this example, the subject is the least significant. As a result, the subject is assigned a weigh of 3.

Further, the repairing system (202) may include a match score determining engine (234). In this example, the match score determining engine (234) determines a match score based on a comparison of the at least one metadata segment and the at least one resource. In one example, the comparison may be a comparison of a level of similarity of the link metadata segments and the resource. In one example, the match score is determined by multiplying each metadata segment similarity level with the assigned weight for the metadata segment. For example, metadata segments being compared to a potentially matching resource are determined to be ninety percent similar in size, eighty percent similar by color, and one-hundred percent similar by subject. These similarity levels are then multiplied by their respective weights of eighty percent, sixty, percent, and thirty percent to determine a raw match score of one-hundred and fifty percent. In this example the match score may be normalized to fifty percent by dividing by the raw match score by the number of metadata segments compared, in this example, three.

Finally, the repairing system (236) may include a threshold determining engine (236). In one example, if a match score for the at least one resource and the at least one metadata segment exceeds a threshold, the at least one resource is matched to the at least one metadata segment. As a result, the link is associated to the at least one resource. For example, a match score of fifty percent or higher may be the threshold to match the at least one resource to the at least one metadata segment.

Figure 3A:
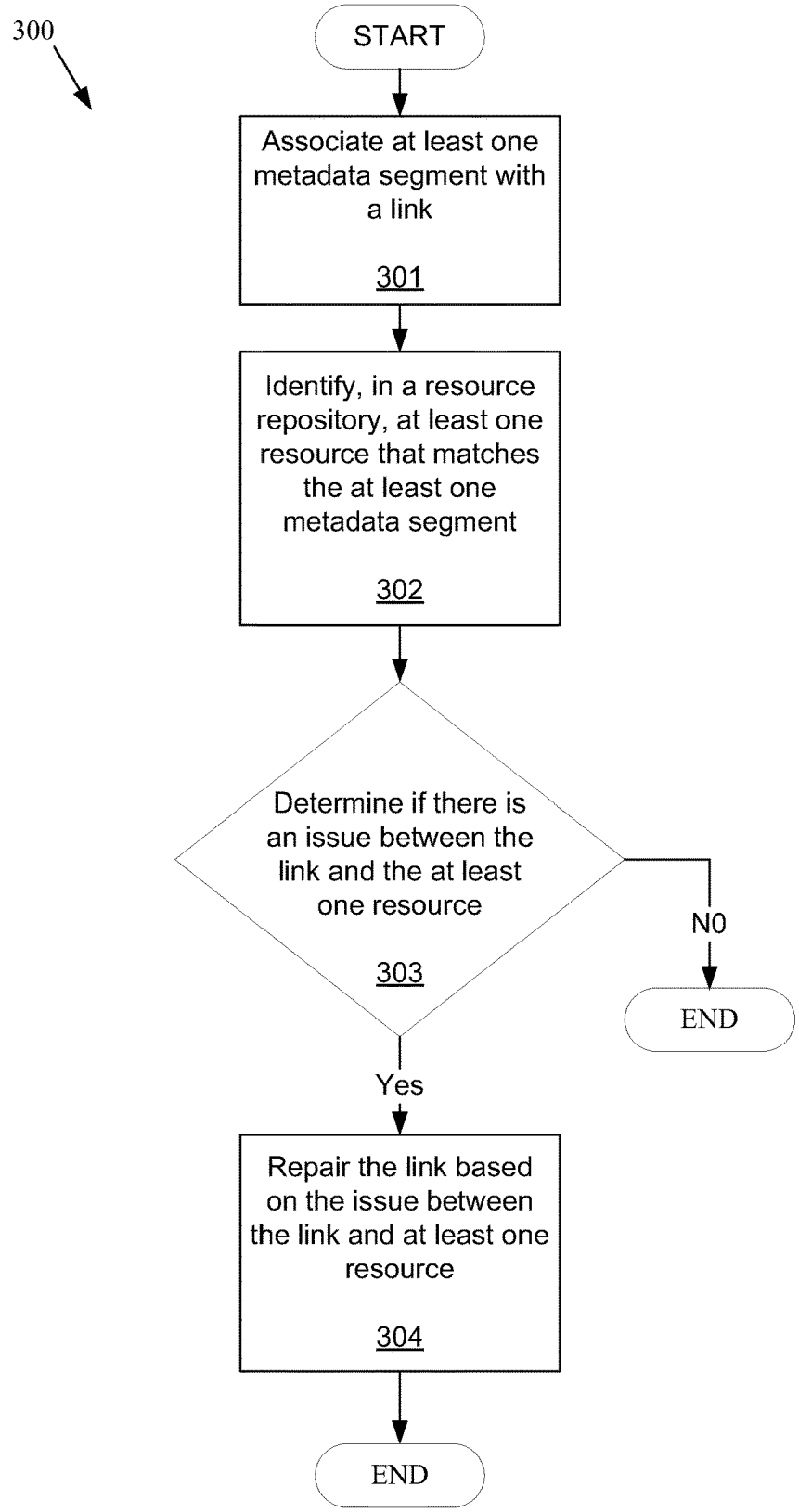
FIG. 3A is a flowchart of a method for repairing a link based on an issue, according to one example of the principles described herein.

FIG. 3A is a flowchart of a method (300) for repairing a link based on an issue, according to one example of the principles described herein. In one example, the method (300) may be executed by the repairing system of FIG. 2. Further, the method (300) includes associating (301) at least one metadata segment with a link, identifying (302), in a resource repository, at least one resource that matches the at least one metadata segment, determining (303) if there is an issue between the link and the at least one resource, and repairing (304) the link based on the issue between the link and at least one resource.

As mentioned above, the method (300) includes associating (301) at least one metadata segment with a link. In one example, a user, such as a website author, specifies a resource to be presented in a website without choosing the exact resource to be presented. For example, the website author desires to display an image of a bicycle in an article that the website author has written. Further, the website author does care what the exact image is as long as it is of a bicycle. However, the website author desires to make sure that the link of the bicycle to the website is maintained such that if the link of the bicycle becomes a broken link, the repairing system of FIG. 2 repairs the link.

In one example, the website author may associate metadata segments with a link to specify such that the metadata segments may include that the resource type is an image, the image encoding is a .png encoding, the size of the image is smaller than 600 by 600 pixels but larger than 400×400 pixels, and the subject of the image should be a bicycle. In another example, metadata segments may also be associated with the link with limited manual intervention by the website author. For example, the website author may select a specific image to be presented on the website and metadata segments about the specific image may be gathered in order to specify characteristics that a matching picture should have. In one example, associating (301) at least one metadata segment with a link, may use an analyzing engine, as mentioned above, to analyze the at least one resource to generate the at least one metadata segment about the at least one resource.

Further, associating (301) at least one metadata segment with a link includes defining a resource type for the at least one resource. As mentioned above, a defining engine may be used to define a resource type for the at least one resource. In keeping with the given example, the resource type may be defined as an image.

Further, associating (301) at least one metadata segment with a link includes presenting a list of metadata segments based on the resource type. In one example, the list of metadata segments may include that the image includes a content type, a size, a format, a theme, other metadata segments or combinations thereof. In one example, the list of metadata segments may be presented to a user such as a website author via a user device. In this example, the website author may select appropriate metadata segments from the list of metadata segments.

Further, associating (301) at least one metadata segment with a link includes associating, from the list of metadata segments, the at least one metadata segment with the link. In keeping with the given example, by selecting appropriate metadata segments from the list of metadata segments, the metadata segments are associated with the link.

As mentioned above, the method (300) includes identifying (302), in a resource repository, at least one resource that matches the at least one metadata segment. In keeping with the given example, the metadata segment about the image of the bicycle is used to identify a matching image to be used in the article for the website. In one example, resources may be identified in a resource repository, such as a database, or may be identified by searching other webpages in the website. For example, a search engine may be used to search for images of bicycles matching the metadata segment.

As mentioned above, the method (300) includes determining (303) if there is an issue between the link and the at least one resource. In one example, determining (303) if there is an issue between the link and the at least one resource includes determining if the issue between the link and the at least one resource is a result of a broken link between the link and the at least one resource, determining if the issue between the link and the at least one resource is a result of the link being moved to a new platform, or combinations thereof. In one example, if the link is determined to have an issue, the method (300) includes repairing (304) the link based on the issue between the link and at least one resource. Alternatively, if the link is determined not to have an issue, the link is not repaired since the link is functioning as intended. As a result, the method (300) ends.

In one example, if the link is determined to have an issue, repairing (304) the link based on the issue between the link and at least one resource includes identifying, in the resource repository, a second resource that matches the at least one metadata segment. As a result, if the at least one resource contributes to a link become a broken link, a second resource is identified in the resource repository. Further, the method (300) matches the second resource to the at least one metadata segment. More information about matching a resource to the at least one metadata segment will be describe in detail later on in this specification.

Figure 3B:
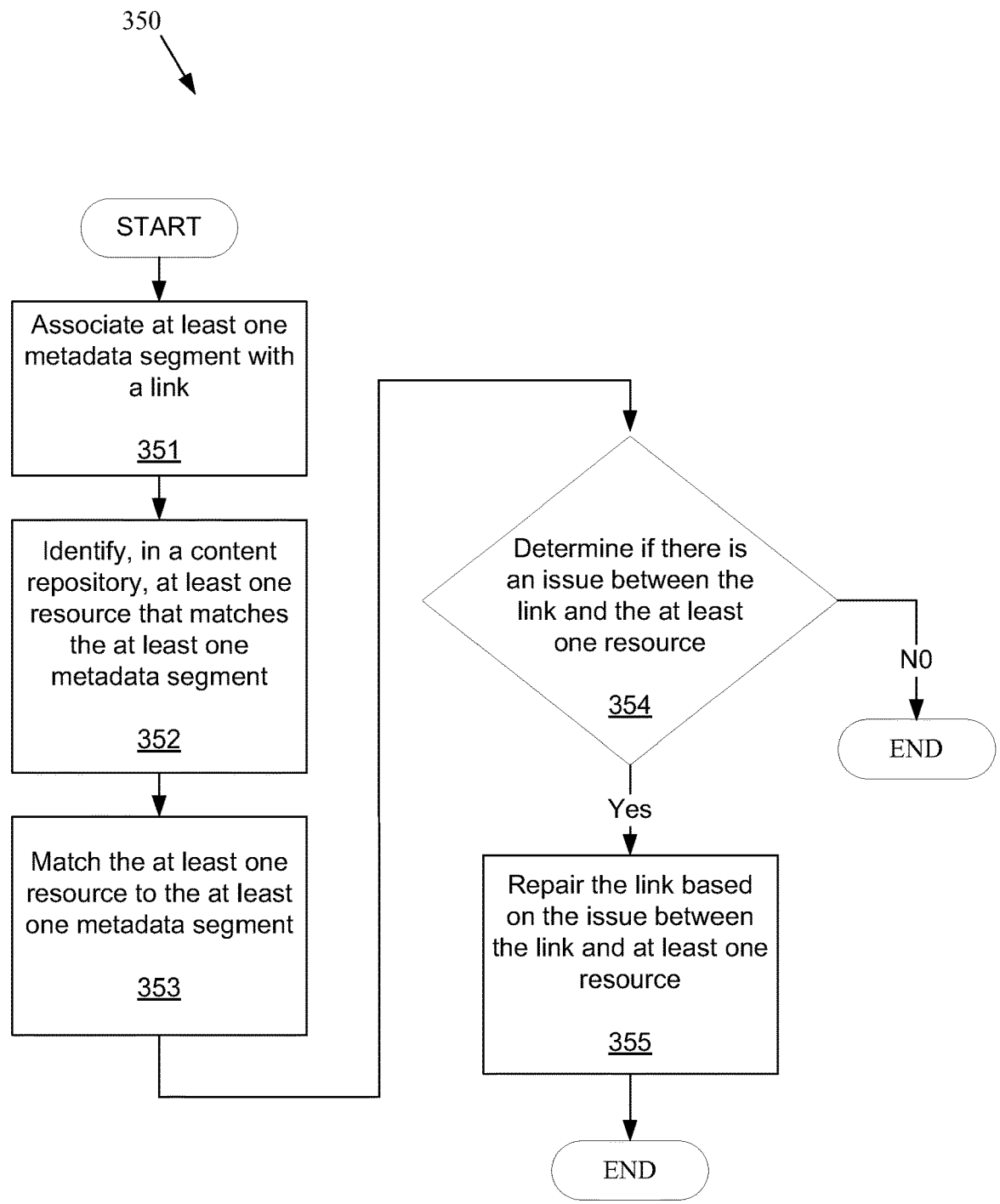
FIG. 3B is a flowchart of a method for repairing a link based on an issue, according to one example of the principles described herein.

FIG. 3B is a flowchart of a method (350) for repairing a link based on an issue, according to one example of the principles described herein. In one example, the method (350) may be executed by the repairing system of FIG. 2. Further, the method (350) includes associating (351) at least one metadata segment with a link, identifying (352), in a resource repository, at least one resource that matches the at least one metadata segment, matching (353) the at least one resource to the at least one metadata segment, determining (354) if there is an issue between the link and the at least one resource, and repairing (355) the link based on the issue between the link and at least one resource.

As mentioned above, the method (350) includes matching (353) the at least one resource to the at least one metadata segment. In one example, matching (353) the at least one resource to the at least one metadata segment includes determining a match score, based on a comparison of the at least one metadata segment and the at least one resource.

In one example, a comparing engine compares the metadata segments associated with the link to the at least one resource. Further, the comparing engine compares the link's metadata segments with the resource's metadata segments. As mentioned above, metadata segments are given a weight for comparing. For example, image may include an image size, a color, and a subject. In one example, the image size may be very significant. As a result, the image is assigned a weight of 8. In keeping with the given example, a color in the image is less significant. As a result, the color in the image is assigned a weight of 6. Further, the subject of the image may be a woman. In this example, the subject is the least significant. As a result, the subject is assigned a weigh of 3.

Further, a determining engine determines a match score based on the comparison of the at least one metadata segment and the at least one resource. In one example, the comparison may be a comparison of a level of similarity of the link metadata segments and the resource. In one example, the match score is determined by multiplying each metadata segment similarity level with the assigned weight for the metadata segment. For example, metadata segments being compared to a potentially matching resource are determined to be ninety percent similar in size, eighty percent similar by color, and one-hundred percent similar by subject. These similarity levels are then multiplied by their respective weights of eighty percent, sixty, percent, and thirty percent to determine a raw match score of one-hundred and fifty percent. In this example the match score may be normalized to fifty percent by dividing by the raw match score by the number of metadata segments compared, in this example, three.

Further, matching (353) the at least one resource to the at least one metadata segment includes matching the at least one resource to the at least one metadata segment if the match score exceeds a threshold. In one example, a threshold determining engine determines if a match score for the at least one resource and the at least one metadata segment exceeds a threshold. In one example, if the match score for the at least one resource and the at least one metadata segment exceeds a threshold, the at least one resource is matched to the at least one metadata segment. As a result, the link is associated to the at least one resource. For example, a match of fifty percent or higher may be mandatory to match the at least one resource to the at least one metadata segment.

While this example, has been described in reference to matching the at least one resource to the at least one metadata segment, the method (350) may be mirrored for matching a second resource to the at least one metadata segment if the link has become a broken link. In this example, the method (350) includes determining a match score based on a comparison of the at least one metadata segment and the second resource, and matching the second resource to the at least one metadata segment if the match score exceeds a threshold.

Figure 4:
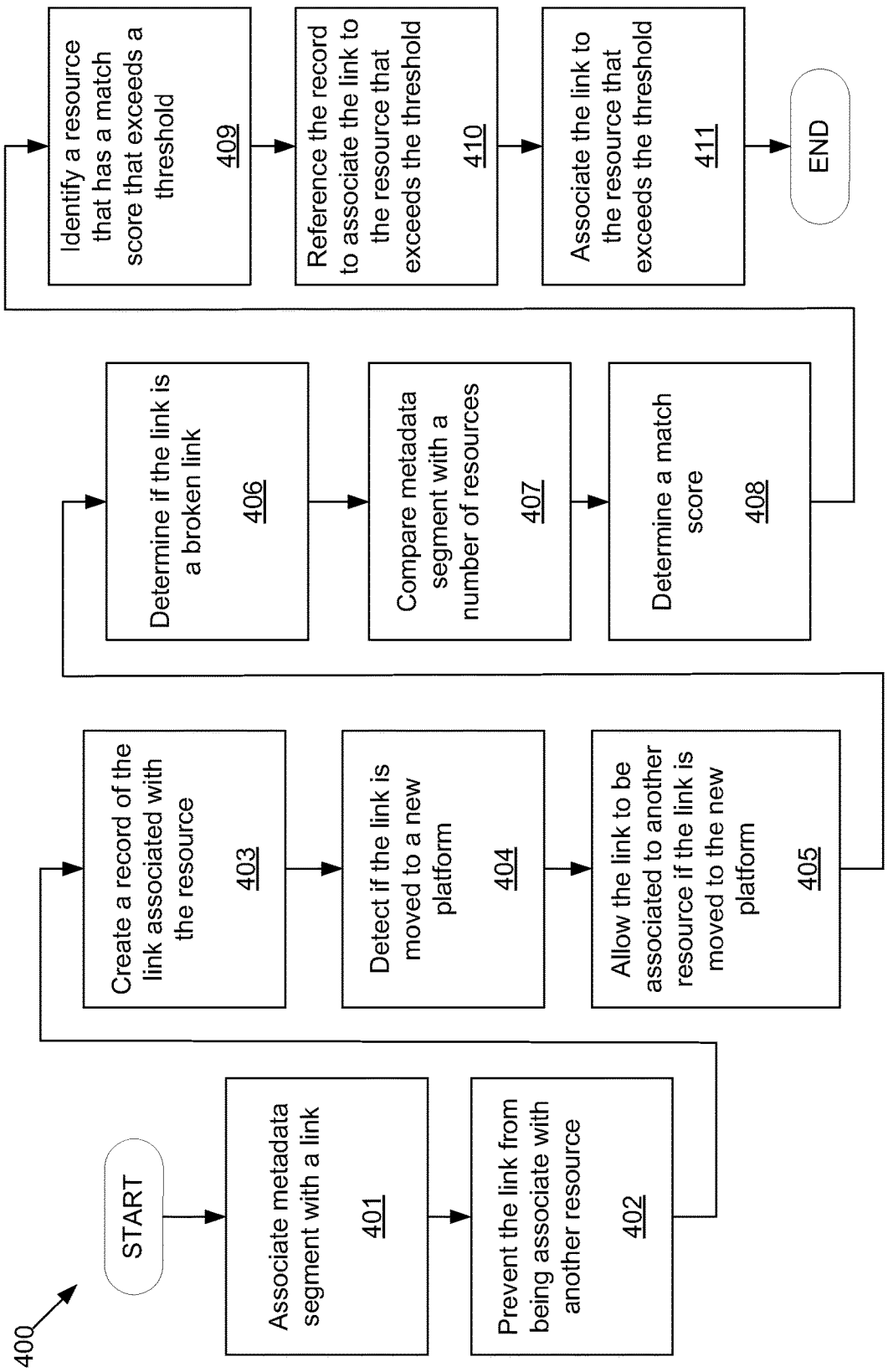
FIG. 4 is a flowchart of a method for associating a link to a resource on a new platform, according to one example of the principles described herein.

FIG. 4 is a flowchart of a method (400) for associating a link to a resource on a new platform, according to one example of the principles described herein. In one example, the method (400) may be executed by the repairing system of FIG. 2. Further the method includes associating (401) metadata segments with a link, preventing (402) the link from being associate with another resource, creating (403) a record of the link associated with the resource, detecting (404) if the link is moved to a new platform, allowing (405) the link to be associated to another resource if the link is moved to the new platform, determining (406) if the link is a broken link, comparing (407) metadata segment with a number of resources, determining (408) a match score, identifying (409) a resource that has a match score that exceeds a threshold, referencing (410) the record to associate the link to the resource that exceeds the threshold, and associating (411) the link to the resource that exceeds the threshold.

In one example, a link such as an enforced hard link with a resource and a fall back to link that is a redundant link is used if a website is published on a new platform. As mentioned above, an enforced hard link is a link with protections placed on the link so that a resource that it is associated with the link is prevented from being removed. As a result, the integrity of the link is maintained. In one example, the link can become a broken link is if the website is published on new platform and the resource did not exist on that platform.

In another example, links without an enforced hard link may be more useful for when a specific resource is not as significant to be associated to the link. For example, a company that maintains a website for selling skiing equipment may make use of several types of resources. For example an image for the company's logo, HTML and CSS files for formatting the page format and style, images of skiing products the company sells, promotional videos, images of satisfied customers, external links to ski instruction websites, user interface controls, other types of resources, or combinations thereof.

To allow the website to present the resources to a user, a website author associates an enforced hard link with a link that is a redundant link to the resources. The website author associates metadata segments with the links (401). In one example, metadata segments may be associated with links using various methods as mentioned above. In one example, metadata segments from an associated resource are associated with the link. For example, a link is associated to an image. The image metadata segments may include the resource type, image size, and encoding. The metadata segments may also help describe what the image shows. For example, metadata segments may include information that the image is of a woman and her age is from 30 to 40 years old. The metadata segments from the image are associated with the link.

In another example, metadata segments may be generated by analyzing a resource. For example, the website author associates a link to a promotional skiing video that shows clips from skiing events and short interviews of skiers. The video is analyzed with voice recognition techniques and a transcription of the interviews is made and included in the metadata segments. Sample frames are taken from the video and analyzed with computer vision functions. In this example, it is determined that the video contains humans, snow, and skis. Further, these details are included in the metadata segments. As a result, the link that is associated with this resource has this metadata segment associated with it.

In yet another example, resource types may also be defined to associate the metadata segments with the link. For example, categories are often defined by a content administrator and are part of a website template. If the resource were an image of a product, the category type would be described as a product image. Further, the metadata segment would be described as a product. For websites with templates, the categories of the resource may be automatically defined and associated with links associated to the resource.

In one example, an enforced hard link with a link that is redundant acts as an enforced hard link on the platform on which they are created. When published to a new platform, enforced hard links maintain the ability to link with the original resource, if available. Enforced hard link with a link that is redundant may be used for resources such as the HTML and CSS files or the company logo where a specific image is desirable. In one example, the website author uses a stock photography service to obtain images of men and women of various ages to use as images of satisfied customers and uses links to include the images in the website. In this example, the enforced hard links are prevented (402) from being associated with another resource. This may be achieved by preventing the resource to from being moved or altered. Further, a record of the link associated to the resource is created (403). As a result, if the link becomes a broken link when moving the website to a new platform, the link may still be enforced.

In one example, it is common for a website template to be reused and new resources added to make a custom website from the base template. For example, the company with the skiing equipment website decides to publish, on a website, a template used for their skiing website to a new platform for selling hiking gear. The layout of the website is similar, product pages, satisfied customer pages, promotional video pages, but the resources of the website change from skiing resources to hiking resources. Attributes such as color schemes and typography may also change. In this example, the method detects (404) when the enforced hard links with a link that is redundant are published on another platform. In response to detecting the links being moved to a new platform, the links are no longer enforced hard links, but are allowed (405) to be associated with another resource.

As mentioned above, when a website template is moved over to the new platform, the method includes determining (406) if the link is a broken link. In keeping with the given example, a new platform for the website template does not have access to most of the resources from the skiing platform. As a result, the links may become broken links. However, since metadata segments can be used to identify matching resources, many of the links that have become broken links may be repaired. For example, the hiking website uses links that are to be associated with satisfied customer images. An example of the metadata segments associated with one of these links may be a category such as a customer, subject such as a person, a photo type such as a portrait, a size such as 400×600 pixels, a gender such as female, and a license such as active. The metadata segments associated with the link is compared (407) with resources. In one example, the link is compared (407) with resources in a resource repository. In some examples, the metadata segments of the link are compared with resource metadata segments and in other examples, resources are analyzed directly to determine there is a similarity to the link's metadata segments.

In one example, several resources may match the link's metadata segments to different degrees. In this example, a match score is determined (408) to indicate the degree of similarity between the link metadata segments and a resource. In some examples, each metadata segment may be given a weight determining the significance for criteria comparison between a resource and the metadata associated with a link. Metadata segments determined to have more significance are given a higher weight. Metadata segments determined to have less significance are given a lower weight.

In some examples, a resource that exceeds a certain threshold has to be identified (409) in order to repair the link. If no suitable match is identified, the author may be notified of the link is a broken link. In some examples, if several suitable matches are found, the match with the highest match score may be selected. In this example, once a suitable matched resource is identified, the record of the link associated with the resource is referenced (410). Further, the link is associated (411) with the resource that exceeds the threshold. As a result, the links in a website allow a user to navigate the website without experiencing broken links.

Figure 5:
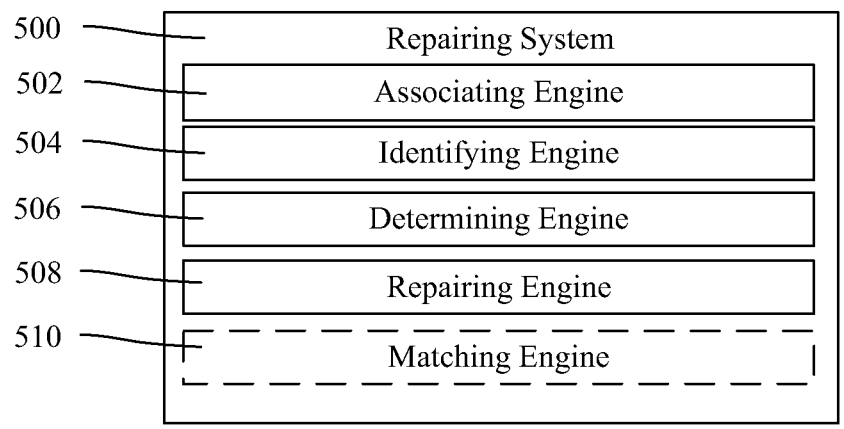
FIG. 5 is a diagram of a repairing system, according to one example of the principles described herein.

FIG. 5 is a diagram of a repairing system (500), according to one example of the principles described herein. The system (500) includes an associating engine (502), an identifying engine (504), a determining engine (506), and a repairing engine (508). In this example, the system (500)

also includes a matching engine (510). The engines (502, 504, 506, 508, 510) refer to a combination of hardware and program instructions to perform a designated function. Each of the engines (502, 504, 506, 508, 510) may include a processor and memory. The program instructions are stored in the memory and cause the processor to execute the designated function of the engine.

The associating engine (502) associates at least one metadata segment with a link. In one example, the associating engine (502) associates one metadata segment with a link. In another example, the associating engine (502) associates several metadata segments with a link.

The identifying engine (504) identifies, in a resource repository, at least one resource that matches the at least one metadata segment. In one example, identifying engine (504) identifies, in a resource repository, one resource that matches the at least one metadata segment. In another example, identifying engine (504) identifies, in a resource repository, several resource that matches the at least one metadata segment.

The determining engine (506) determines if there is an issue between the link and the at least one resource. In one example, the determining engine (506) determines if the issue between the link and the at least one resource is a result of a link becoming a broken link, if the issue between the link and the at least one resource is a result of the link being moved to a new platform, or combinations thereof.

The repairing engine repairs (508) repairs the link based on the issue between the link and at least one resource. In one example, the repairing engine (508) repairs the link based on the issue between the link and at least one resource by identifying, in the resource repository, a second resource that matches the at least one metadata segment. Further, the repairing engine (508) repairs the link based on the issue between the link and at least one resource by matching the second resource to the at least one metadata segment. Still further, the repairing engine (508) repairs the link based on the issue between the link and at least one resource by associating the link to the second resource.

The matching engine (510) matches the at least one resource to the at least one metadata segment. In one example, the matching engine (510) matches the at least one resource to the at least one metadata segment by determining a match score, based on a comparison of the at least one metadata segment and the at least one resource. Further, the matching engine (510) matches the at least one resource to the at least one metadata segment by matching the at least one resource to the at least one metadata segment if the match score exceeds a threshold.

Figure 6:
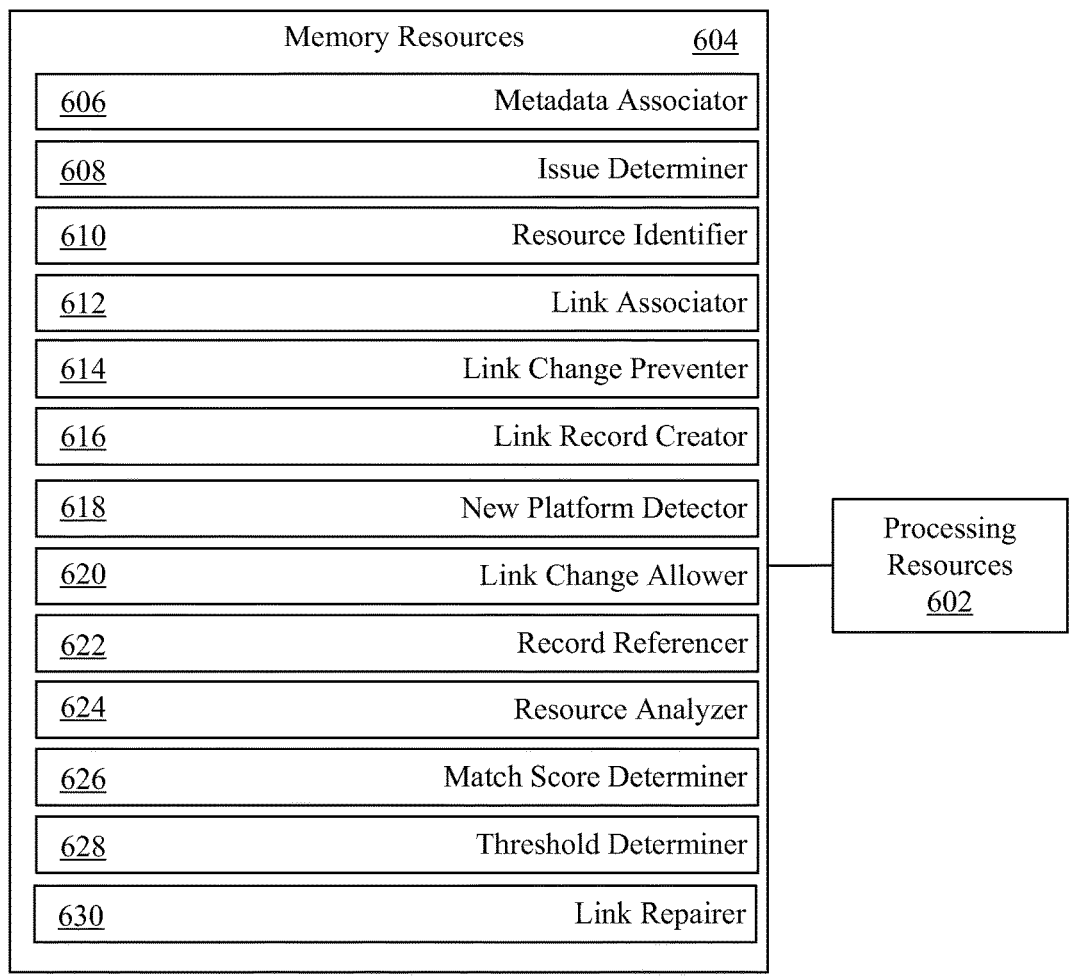
FIG. 6 is a diagram of a repairing system, according to one example of the principles described herein.

FIG. 6 is a diagram of a repairing system (600), according to one example of the principles described herein. In this example, the system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the identification system (600). The programmed instructions shown stored in the memory resources (604) include a metadata associator (606), a issues determiner (608), a resource identifier (610), a link associator (612), a link change preventer (614), a link record creator (616), a new platform detector (618), a link change allower (620), a record reference (622), resource analyzer (624), a match score determiner (626), a threshold determiner (628), and a link repairer (630).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The metadata associator (606) represents programmed instructions that, when executed, cause the processing resources (602) to associate at least one metadata segment with a link. The issues determiner (608) represents programmed instructions that, when executed, cause the processing resources (602) determine if there is an issue between the link and the at least one resource. The resource identifier (610) represents programmed instructions that, when executed, cause the processing resources (602) to identify, in a resource repository, at least one resource that matches the at least one metadata segment. The link assoicator (612) represents programmed instructions that, when executed, cause the processing resources (602) to associate a link to the at least one resource.

The link change preventer (614) represents programmed instructions that, when executed, cause the processing resources (602) to prevent a link from being associated with another resource. The link record creator (616) represents programmed instructions that, when executed, cause the processing resources (602) to create a record of a resource that is associated with the link. The new platform detector (618) represents programmed instructions that, when executed, cause the processing resources (602) to detect if a link has been moved to a new platform. The link change allower (620) represents programmed instructions that, when executed, cause the processing resources (602) to allow a link to be associated with a second resource. The record reference (622) represents programmed instructions that, when executed, cause the processing resources (602) to reference a record of a link in order to associate the link to the at least one resource.

The resource analyzer (624) represents programmed instructions that, when executed, cause the processing resources (602) to analyze the at least one resource to produce metadata segments. The match score determiner (626) represents programmed instructions that, when executed, cause the processing resources (602) to determine a match score between link metadata segment and the at least one resource, a second resource, or combinations thereof. The threshold determiner (628) represents programmed instructions that, when executed, cause the processing resources (602) to determine if a match sore exceeds a threshold. The link repairer (630) represents programmed instructions that, when executed, cause the processing resources (602) to repair the link based on the issue between the link and at least one resource.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (602) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the identification system (600) may be implemented on a user device, on a server, on a collection of servers, or combinations thereof.

The repairing system (600) of FIG. 6 may be part of a general purpose computer. However, in alternative examples, the repairing system (600) is part of an application specific integrated circuit.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A method for repairing a link based on an issue, the method comprising:
    analyzing at least one resource;
    identifying a number of attributes of each resource; and
    generating a metadata segment, in a resource repository, about the at least one resource that indicates the number of attributes;
    associating at least one metadata segment with a link, wherein:
        the link originally comprises navigation information to a designated resource, the at least one metadata segment being in addition to the navigation information of the link; and
        the metadata segment associated with the link indicates a type of resource to be associated with the link and attributes of a resource to be associated with the link;
    comparing the resource metadata segments with the link metadata segments to identify a resource that matches a desired image to be associated with the link;
    identifying, in a resource repository, at least one resource that matches the at least one metadata segment already associated with the link;
    determining if there is an issue between the link and the at least one resource;
    determining if the issue between the link and the at least one resource is a result of the link becoming a broken link, if the issue between the link and the at least one resource is a result of the link being moved to a new platform, or combinations thereof; and
    changing the navigation information of the link to repair the link in response to there being a determined issue between the link and at least one resource;
    in which repairing the link based on the issue between the link and the at least one resource comprises, at least, identifying, in the resource repository, a second resource that matches the at least one metadata segment; matching the second resource to the at least one metadata segment.

2. The method of claim 1, in which repairing the link based on the issue between the link and the at least one resource further comprises:
    associating the link to the second resource.

3. The method of claim 1, in which associating at least one metadata segment with a link further comprises creating a record indicating the at least one metadata segment is associated with the link.

4. The method of claim 1, in which associating the at least one metadata segment with the link further comprises analyzing the at least one resource to generate the at least one metadata segment about the at least one resource.

5. The method of claim 4, in which associating the at least one metadata segment with the link further comprises:
    defining a resource type for the at least one resource;
    presenting, to a user, a list of metadata segments based on the resource type; and
    associating, from the list of metadata segments, the at least one metadata segment with the link.

6. The method of claim 1, further comprising matching the at least one resource to the at least one metadata segment.

7. The method of claim 6, in which matching the at least one resource to the at least one metadata segment comprises:
    determining a match score based on a comparison of the at least one metadata segment and the at least one resource; and
    matching the at least one resource to the at least one metadata segment if the match score exceeds a threshold.

8. The method of claim 7, in which determining the match score based on the comparison of the at least one metadata segment to the at least one resource further comprises multiplying the match score by a weight.

9. The method of claim 2, in which matching the second resource to the at least one metadata segment comprises:
    determining a match score based on a comparison of the at least one metadata segment and the second resource; and
    matching the second resource to the at least one metadata segment if the match score exceeds a threshold.

10. The method of claim 9, in which determining a match score based on the comparison of the at least one metadata segment and the second resource further comprises multiplying the match score by a weight.

11. A method for repairing a link based on an issue, the link comprising location data for a resource associated with the link, the method comprising:
    analyzing at least one resource;
    identifying a number of attributes of each resource; and
    generating a metadata segment, in a resource repository, about the at least one resource that indicates the number of attributes;
    associating at least one metadata segment with a link in addition to the location data of the link, wherein the metadata segment associated with the link indicates a type of resource to be associated with the link and attributes of a resource to be associated with the link;
    comparing the resource metadata segments with the link metadata segments to identify a resource that matches a desired image to be associated with the link;

identifying, in a resource repository, at least one resource that matches the at least one metadata segment already associated with the link;

determining whether there is an issue between the link and the resource associated with the link;

determining if the issue between the link and the at least one resource is a result of the link becoming a broken link, if the issue between the link and the at least one resource is a result of the link being moved to a new platform, or combinations thereof; and repairing the link, when needed, based on the issue between the link and the resource associated with the link, the repairing using the matching at least one resource identified in the resource repository;

wherein the matching at least one resource identified in the resource repository is different from the resource originally associated with the link.

12. The method of claim 11, wherein the metadata segment indicates with what types of resources the link should be associated.

13. The method of claim 11, wherein, when the resourced associated with the link is an image, the metadata segment includes at least one of: a size, dimensions, encoding type, semantic content, tone, predominant color, topic, and category of the image.

14. The method of claim 11, wherein, when the resource is a video, the metadata segment includes at least one of: size, dimensions, encoding type, quality, language, semantic meaning, tone, topic and category of the video.

15. The method of claim 11, wherein, when the resource is a webpage, the metadata segment includes at least one of: information relating to a topic, specific words and a ranking of that webpage.

16. The method of claim 11, in which the determining further determines if the issue between the link and the associated resource is a result of the link being moved to a new platform.

17. The method of claim 11, in which the repairing further comprises:

identifying, in the resource repository, a second resource that matches the at least one metadata segment; and associating the link to the second resource.

18. The method of claim 1, wherein:

the link comprises location data for a resource associated with the link; and the metadata segment characterizes the resource associated with the link in addition to the location data.

* * * * *